E. A. THIEM.
CHANGE SPEED MECHANISM.
APPLICATION FILED DEC. 26, 1913.

1,250,386.

Patented Dec. 18, 1917.
2 SHEETS—SHEET 1.

Witnesses,
F. J. Mann,
S. M. Ryan

Inventor;
Edward A. Thiem.
By Offield, Towle, Graves & Offield.
Attys.

E. A. THIEM.
CHANGE SPEED MECHANISM.
APPLICATION FILED DEC. 26, 1913.
1,250,386.
Patented Dec. 18, 1917.
2 SHEETS—SHEET 2.
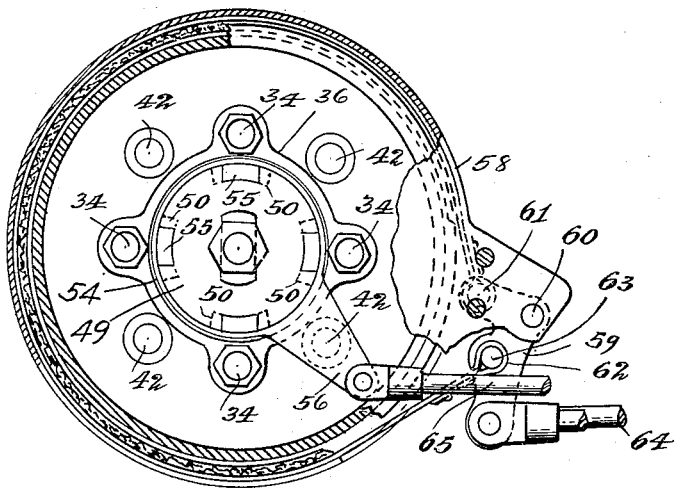
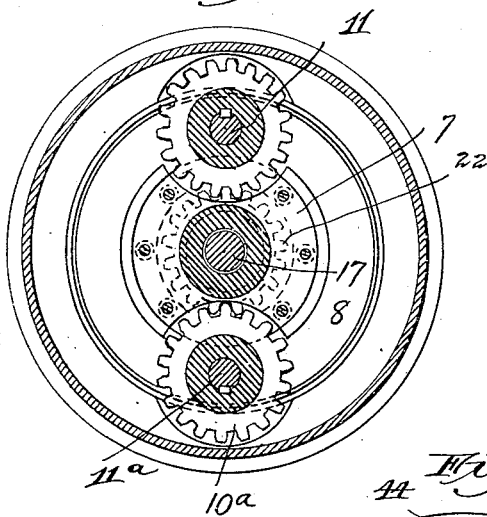
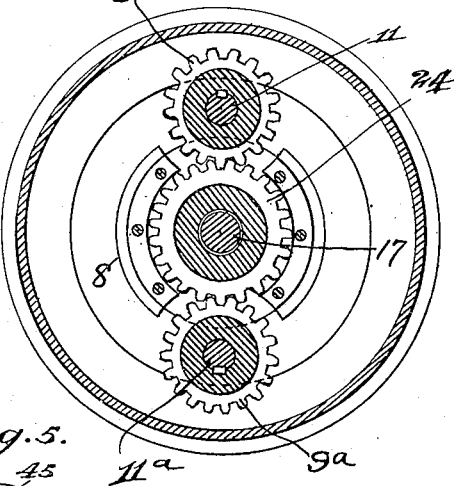
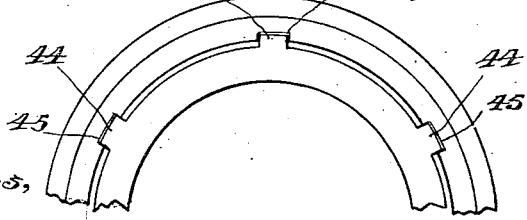
Witnesses,
J. S. Mann,
S. M. Ryan
Inventor,
Edward A. Thiem.
By Offield, Towle, Graves & Offield
Attys.

UNITED STATES PATENT OFFICE.

EDWARD A. THIEM, OF ST. PAUL, MINNESOTA.

CHANGE-SPEED MECHANISM.

1,250,386.　　　　Specification of Letters Patent.　　Patented Dec. 18, 1917.

Application filed December 26, 1913. Serial No. 808,726.

*To all whom it may concern:*

Be it known that I, EDWARD A. THIEM, a citizen of the United States, residing in the city of St. Paul, county of Ramsey, and State of Minnesota, have invented certain new and useful Improvements in Change-Speed Mechanism, of which the following is a specification.

In the transmission of power from an engine to a driven member there are many mechanisms where a change-speed device is most desirable. This is particularly true in the operation of motorcycles or cycle cars where a vehicle frequently stops, or it becomes necessary to travel at greatly varying rates of speed within short intervals. The change-speed mechanism must also be of durable construction to withstand the quick speed variations and so designed as to afford speed changes without undue strain being thrown upon the power-transmitting elements from the engine to the change-speed mechanism, or upon the change-speed mechanism itself.

Furthermore, it is desirable to have a simple, light and strong device when used in connection with motorcycles or cycle cars, for which my invention is particularly adapted.

To these ends my invention consists in the construction shown in the accompanying drawing, in which, Figure 1 is a sectional view of my improved speed change mechanism;

Fig. 2 is a side elevational view of one side of my device with parts broken away and other parts in section;

Fig. 3 is a sectional view on the line 3—4 of Fig. 1;

Fig. 4 is a sectional view on the line 4—4 of Fig. 1;

Fig. 5 is a detailed fragmentary view of the interlocking of a disk to one part of my device.

Figure 1:
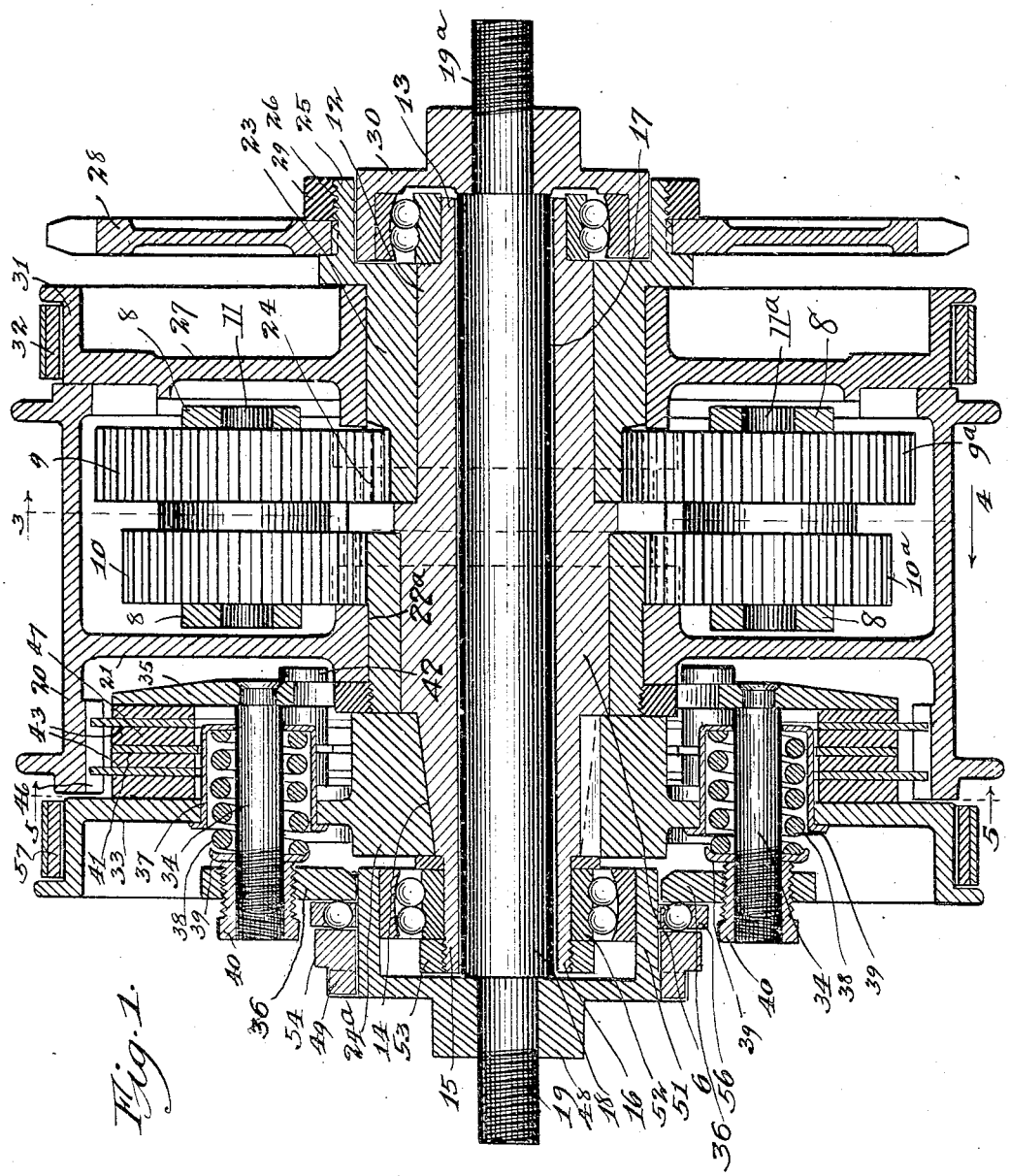

Referring now more particularly to the drawings, the invention comprises a planetary member consisting of a hub 6 provided with a vertical web 7 carrying two circumferentially arranged side plates 8 between which are mounted two pairs of gears that are oppositely disposed, the gears 9 and $9^a$ having the same diameters, while the gears 10 and $10^a$ are of the same diameters but smaller than the gears 9 and $9^a$. The gears 9 and 10 are mounted upon the pinion 11 and the gears $9^a$ and $10^a$ upon the pinion $11^a$. Each pair of gears may be formed integral if desired. In the construction shown the gears 9 and $9^a$ are upon one side of the vertical web 7 and the gears 10 and $10^a$ are upon the opposite side of said web.

The hub 6 has an extension 12 and the end thereof is reduced as shown at 13. The other side of the hub is tapered as shown at 14 terminating in a reduced straight section 15, the end of which is provided with threads 16. The hub 6 and its extensions are provided with a central opening 17 through which the axle 18 extends. The axle 18 is provided with reduced ends 19 and $19^a$ which are suitably threaded. A drum or main hub 20 to which a wheel is secured (not shown) is provided with an internal web 21 intermediate its ends and has a central bearing opening $22^a$ whereby the drum hub is rotatably mounted on the hub 6. Fixed to the web 21 is a gear 22, the teeth of which mesh with the teeth of the gears 10 and $10^a$.

A collar 23 is rotatably mounted upon the extension 12 of the hub 6, the inner end of which carries a gear 24, the teeth of which are in mesh with the gears 9 and $9^a$ and the outer end of the collar is provided with an enlarged end 25 having external threads 26. A brake drum 27 is rotatably mounted on the collar 23 and a sprocket wheel 28 is mounted upon the threaded end 25 of the collar 23 held thereto by a retaining ring 29.

A bearing designated as a whole by 30 has its inner race surface resting upon the reduced end 13 of the hub 6 and its outer race surface in engagement with the inner surface of the enlarged end of the collar 23.

The brake drum 27 is provided with a brake surface 31 around which the brake band 32 is placed.

The controlling member 33 comprises an inwardly extending and tapered boss $24^a$ mounted on the tapered portion 14 of the hub 6 and keyed to the hub. The vertical web of the drum 33 has four bolts 34 extending transversely through it, two of said bolts being shown in Fig. 1 and all shown in Fig. 2. The inner ends of the bolts carry a friction disk 35 while the outer ends of the bolts carry a pressure plate 36. A cup 37 surrounds each bolt within which are disposed springs 38, one end of each bearing against its cup and the other end against washers 39, which, in turn, abut against the nuts 40 upon the threaded outer ends of the bolts 34. The disk 41 is connected to the controlling member 33 by means of the pins 42 that pass through the disks and are connected to the controlling member, so that the disks 35 and 41 rotate with the controlling member at all times. The disks 43, however, are provided with lugs 44 fitting within the slots 45 formed in the flange 46 on the drum hub 20 so that the disks 43 rotate with the drum hub. The disks 35, 41 and 43 are separated by suitable material 47, a disk of such material also being interposed between one of the disks 43 and the inner face of the controlling member 33.

It will be readily seen from the foregoing description that upon an inward movement being given to the plate 36 the springs 38 will be compressed forcing the disk 35 away from the disk 43, thereby reducing the friction between the disks and the intermediate material permitting independent rotation between the drum hub 20 and the controlling member 33. As a means for moving the disk 35 I have herein shown one portion of a cam member 48 provided with a flange 49 having recesses 50 formed therein (shown in Fig. 2). The cam 48 is provided with an inwardly extending bearing surface 51 and interposed between said bearing surface and the extension 15 of the hub 6 is a suitable bearing designated as a whole by 52, said bearing 52 being held in place by a retaining ring 53. A cam 54 is mounted upon the extension 51 of the cam 48 and is provided with projections 55 adapted to enter the recesses 50 of the cam 48. A suitable bearing plate 56 is interposed between the outer face of the plate 36 and the inner face of the cam 54. An arm 56 is formed on the cam 54 for actuating the same. A brake-band 57 surrounds the braking surface of the controlling member 33. The cam 48 is suitably recessed to receive the reduced end 19 of the axle 18 and it is of course understood that nuts are applied to the threaded reduced ends 19 and $19^a$ to hold the parts together.

The brake-band 57 is arranged within a casing 58 to which a bell-crank 59 is pivoted on the pin 60. One end 61 of the brake-band 57 is connected to the bell-crank on one side of its pivot 60 and the other end 62 is connected to the pin 63 on the bell-crank 59 so that when the bell-crank is moved by the rod 64, the brake-band is tightened or loosened according to the direction of movement given the lever 64. A lever rod 65 is connected to the arm 56 of the cam 54.

Having now described the parts of my invention in detail I will proceed to describe the relation of such parts and the operation of the device as a whole: Any suitable means, of course, may be employed for transmitting power from the engine to the sprocket wheel 28, such as a chain or a belt-wheel might be substituted for the sprocket wheel and a belt drive of course used. In the construction shown it is of course understood that a wheel is secured to the drum-hub 20 by means of suitable spokes, but, of course, the drum-hub might be used as a belt or pulley wheel if so desired.

Assuming, however, that the sprocket wheel 28 is rotated, this will cause the gear 24 to rotate thereby rotating the gears 9 and $9^a$ and 10 and $10^a$ causing the hub 6 carrying the planetary gears to rotate around the axle 18 and the planetary gears 9 and $9^a$ and 10 and $10^a$ to rotate around the gear 22 that is fixed to the drum-hub 20. As the parts so far described have no direct connection with the drum hub 20, it is of course obvious that there will be no movement of the drum hub or wheel that may be attached thereto.

When it is desired, however, to drive the drum hub the first speed is obtained by tightening the brake band 57, there being means provided, but not herein shown, for automatically relieving the tension between the disks upon the tightening of the brake bands. When the brake band 57 is tightened the controlling member 33 is held stationary and since the controlling member 33 is keyed to the hub the planetary gears 9 and $9^a$ and 10 and $10^a$ will consequently be held stationary, whereupon the drum hub 20 will be driven by the action of the gears 10 and $10^a$ upon the gear 22 fixed to the drum hub, the gears 10 and $10^a$ being formed integral with the gears 9 and $9^a$ and being rotated through the action of the gear 24 driven directly by the sprocket 28. This gives a slow or reduced speed. When driving at low speed the projections 55 are in a position intermediate the slots 50, the plate 36 having been thereby moved inwardly to separate the disks 35, 41 and 43 and relieve the tension between the disks. When, however, it is desired to change from low into high speed this can be accomplished by releasing the brake band 57 and at the same time giving a partial rotary movement to the cam 54, whereby the projections 55 drop into the slots 50. The springs 38 then force the plate 36 away from the controlling drum 33 thereby producing friction between the disks 35, 41 and 43 and the friction material 47 therebetween, and since the disks 35 and 41 are directly connected to the controlling member 33 and the disks 43 are interlocked with the drum hub 20, the drum hub will, consequently, be thereby driven as the gear 24 will revolve the hub 6 through the gears 9 and $9^a$ and since the hub 6 is directly connected to the controlling drum 33 and the controlling drum in turn directly connected to the drum hub 20, the drum hub will necessarily be rotated.

When it is desired to bring the mechanism into neutral position, the cam 54 is moved so as to decrease the friction between the disks and if the brake band 57 is not engaging the brake surface of the controlling hub 33 it is obvious that the parts will freely rotate, leaving the hub 20 stationary.

By tightening the brake band 32, the rotation of the drum hub 20 may be stopped at any time, provided the power is not being applied since the brake drum 27 is rigidly connected to the drum hub 20.

Having now described my invention,—I claim:

1. A change speed mechanism comprising an axle, a planetary member revolubly mounted thereon, a pair of small and a pair of large gears mounted on said planetary member, a hub on said planetary member, a main hub rotatably and independently mounted on the hub of said planetary member, a gear on said main hub in mesh with the small gears carried by said planetary member, a driving member on said planetary hub, a gear upon said driving member in mesh with the large gears carried by said planetary member, a controlling member rigidly connected to the hub of said planetary member, a friction member carried by said controlling member, comprising a pair disks, one of which is laterally movable relative to the other, the other of said disks having a locking connection with said main hub and brake means for holding said controlling member stationary.

2. A speed change mechanism comprising an axle, a planetary member revolubly mounted thereon, a pair of small and a pair of large gears mounted on said planetary member, a hub on said planetary member, a main hub rotatably and independently mounted on the hub of said planetary member, a gear on said main hub in mesh with the small gears carried by said planetary member, a driving member on said planetary member, a brake member independently and rotatably mounted on said driving member and rigidly secured to said main hub, a gear on said driving member in mesh with the large gears carried by said planetary member, a controlling member rigidly connected to the hub of said planetary member, a friction member carried by said controlling member, comprising a pair of disks, one of which is laterally movable relative to the other, the other of said disks having a locking connection with said main hub and brake means for holding said controlling member stationary.

3. A change speed mechanism comprising an axle, a planetary member revolubly mounted thereon, a pair of small and a pair of large gears mounted on said planetary member, a hub on said planetary member, a main hub rotatably and independently mounted on said planetary hub and inclosing said planetary member, a gear on said main hub in mesh with the small gears carried by said planetary member, a driving member on said planetary hub, a gear on said driving member in mesh with the large gears carried by said planetary member, a controlling member rigidly connected to the hub of said planetary member, a friction member carried by said controlling member, comprising a pair of disks, one of which is laterally movable relative to the other, the other of said disks having a locking connection with said main hub and brake means for holding said controlling member stationary.

4. A change speed mechanism comprising an axle, a planetary member revolubly mounted thereon, a pair of small and a pair of large gears mounted on said planetary member, a hub on said planetary member, a main hub rotatably and independently mounted on the hub of said planetary member, gears on said main hub in mesh with the small gears carried by said planetary member, a driving member on said planetary hub, a gear on said driving member in mesh with the large gears carried by said planetary member, a controlling member rigidly connected to the hub of said planetary member, a friction member carried by said controlling member, comprising a pair of disks, one of which is laterally movable relative to the other, the other of said disks having a locking connection with said main hub, spring means for normally holding said disks in frictional engagement and cam means carried by said axle for releasing the friction between said disks and brake means for holding said controlling member stationary.

5. A change speed mechanism comprising an axle, a planetary member revolubly mounted thereon, a pair of small and a pair of large gears mounted on said planetary member, a hub on said planetary member, a main hub rotatably and independently mounted on the hub of said planetary member, a gear on said main hub in mesh with the small gears carried by said planetary member, a driving member on said planetary hub, a gear upon said driving member in mesh with the large gears carried by said planetary member, a controlling member rigidly connected to the hub of said planetary member, a friction member carried by said controlling member, comprising a pair of disks, one of which is laterally movable relative to the other, the other of said disks having a locking connection with said main hub, movable studs supporting said laterally movable disk, a cam carried by said axle and adapted to move said studs thereby reducing the friction between said disks and brake means for holding said controlling member stationary.

6. A change speed mechanism comprising an axle, a planetary member revolubly mounted thereon, a pair of small and a pair of large gears mounted on said planetary member, a hub on said planetary member, a main hub rotatably and independently mounted on the hub of said planetary member, a gear on said main hub in mesh with the small gears carried by said planetary member, a driving member on said planetary hub, a gear on said driving member in mesh with the large gears carried by said planetary member, a controlling member rigidly connected to the hub of said planetary member, a friction member carried by said controlling member, comprising a pair of disks, one of which is laterally movable relative to the other, the other of said disks having a locking connection with said main hub, movable studs supporting said laterally movable disk, a pressure plate secured to said studs, a cam member carried by said axle and adapted to move said pressure plate to thereby reduce the friction between said disks and means for holding said controlling member stationary.

7. A change speed mechanism comprising an axle, a planetary member revolubly mounted thereon, a pair of small and a pair of large gears mounted on said planetary member, a hub on said planetary member, a main hub rotatably and independently mounted on the hub of said planetary member, a gear on said main hub in mesh with the small gears carried by said planetary member, a driving member on said planetary hub, a gear on said driving member in mesh with the large gears carried by said planetary member, a controlling member rigidly connected to the hub of said planetary member, a friction member carried by said controlling member, comprising a pair of disks, one of which is laterally movable relative to the other, the other of said disks having a locking connection with said main hub, movable studs laterally supporting said movable disks, a cam member rigidly mounted on said axle provided with a plurality of cam slots and a cam actuated member rotatably mounted on said cam member provided with a plurality of projections adapted to enter said slots whereby the friction between said disks is increased or decreased by the movement of said cam actuated member relative to said cam member and means for holding said controlling member stationary.

EDWARD A. THIEM.

Witnesses:
FRED JOERUS,
C. J. MONAHAN.

Copies of this patent may be obtained for five cents each, by addressing the "Commissioner of Patents, Washington, D. C."